United States Patent [19]

Basso et al.

[11] 4,191,886
[45] Mar. 4, 1980

[54] RADIATION DOSE RATE INDICATOR

[75] Inventors: Michael J. Basso, West Allenhurst; Henry B. Brown, Belford, both of N.J.

[73] Assignee: The United States of America as represented by the Secretary of the Army, Washington, D.C.

[21] Appl. No.: 929,623

[22] Filed: Jul. 31, 1978

[51] Int. Cl.² .............................................. G01T 1/18
[52] U.S. Cl. .................................................. 250/376
[58] Field of Search ........................ 250/376, 377, 378

[56] References Cited

U.S. PATENT DOCUMENTS 3,015,031  12/1961  Dilworth et al. ................ 250/378 X Primary Examiner—Davis L. Willis
Attorney, Agent, or Firm—Nathan Edelberg; Jeremiah G. Murray; Daniel D. Sharp

[57] ABSTRACT

A pocket size dose rate monitor is disclosed which is meterless, small and rugged. The instrument is cylindrically shaped so as to be carried, for example, in the shirt pocket of a user. A battery powered blocking oscillator drives a Geiger-Mueller ionization chamber which is series connected to a potentiometer whose movable slider contact is associated with an indicator scale which is calibrated, for example, in dose rate. The slider contact is also electrically coupled to a circuit which is adapted to control the energization of a miniature electric lamp or other type of light source such as a light emitting diode. For a measuring or monitoring dose rate, the user manipulates an actuator element which varies a control voltage selected from the voltage appearing across a calibrated potentiometer for controlling the operation of the control circuit. Since the voltage across the potentiometer varies in proportion to the dose rate due to the effect of the ionization chamber, the light source will be energized when a certain dose rate is detected.

18 Claims, 7 Drawing Figures

RADIATION DOSE RATE INDICATOR

The invention described herein may be manufactured and used by or for the Government for governmental purposes without the payment of any royalties thereon or therefor.

BACKGROUND OF THE INVENTION

This invention relates generally to a radiation metering device and more particularly to a nuclear radiation rate indicator adapted to be carried or worn by an individual user such as a combat soldier.

While small rugged radiation meters for individual use are known, such devices typically require jeweled or torsion wire movement meters which are susceptible to shocks and abnormal abuse encountered under certain operational environments such as combat conditions.

It is therefore an object of the present invention to provide an improved nuclear radiation dose rate indicator which is meterless, rugged, relatively inexpensive to manufacture, is extremely easy to operate, and when necessary repair. One such device is taught in U.S. Pat. No. 3,015,031, R. H. Dilworth, et al. entitled "Personal Radiation Monitor" which issued on Dec. 26, 1961.

SUMMARY

These and other objects are provided in accordance with the subject invention which comprises a radiation sensing and indicator circuit contained within a small cylindrical type casing or housing which, for example, fits into the shirt pocket of the user. The casing includes a movable actuator element which coacts with a calibrated scale or dial to set the position of the slider contact of an electrical potentiometer which is series connected to a radiation sensing ionization chamber coupled to and driven by a battery operated high voltage power supply. The slider contact of the potentiometer is connected to a control circuit coupled to a light source which is adapted to be energized when the control circuit is operated. Operation of the control circuit varies in accordance with the movable contact voltage and accordingly the voltage across the potentiometer. Thus, the user presets a dose rate level or measures an unknown local radiation level by means of the setting of the calibrated potentiometer which controls the lighting of the light source to provide a desired indication of the local radiation dose rate level.

DESCRIPTION OF THE PREFERRED EMBODIMENTS

Figure 1:
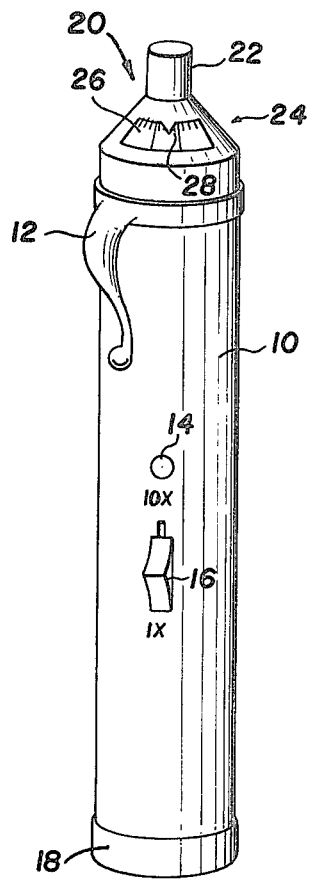
FIGS. 1 and 2 are perspective views illustrative of first and second embodiments of casings for the subject invention.

Referring now to the drawings and more particularly to FIG. 1, reference numeral 10 designates a pocket type pen/pencil size tubular instrument casing provided with a clip 12. The casing 10, inter alia, is adapted to hold a DC power source, not shown, which may be for example a DC battery of a known conventional type. The barrel of the tubular casing 10 includes an aperture 14 for an indicator light source as well as a user operated switch actuator element 16. A screw cap or cover 18 for inserting a battery is located at one end of the casing 10 while the other end is terminated in a frusto conical end section 20 having a knurled user knob 22 projecting therefrom. Additionally, a portion of the end section 20 includes a dial assembly 24 consisting of a graduated scale 26 adapted to be moved relative to the pointer 28 by means of the knob 22. The purpose of the dial assembly 24 will become evident when the circuitry shown in FIGS. 3 and 4 are considered.

Figure 2:
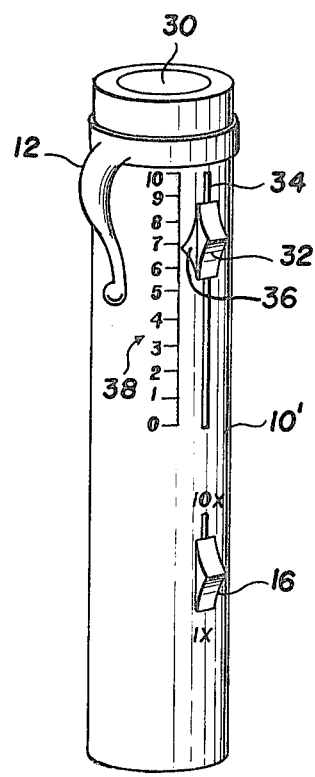
Figure 5:
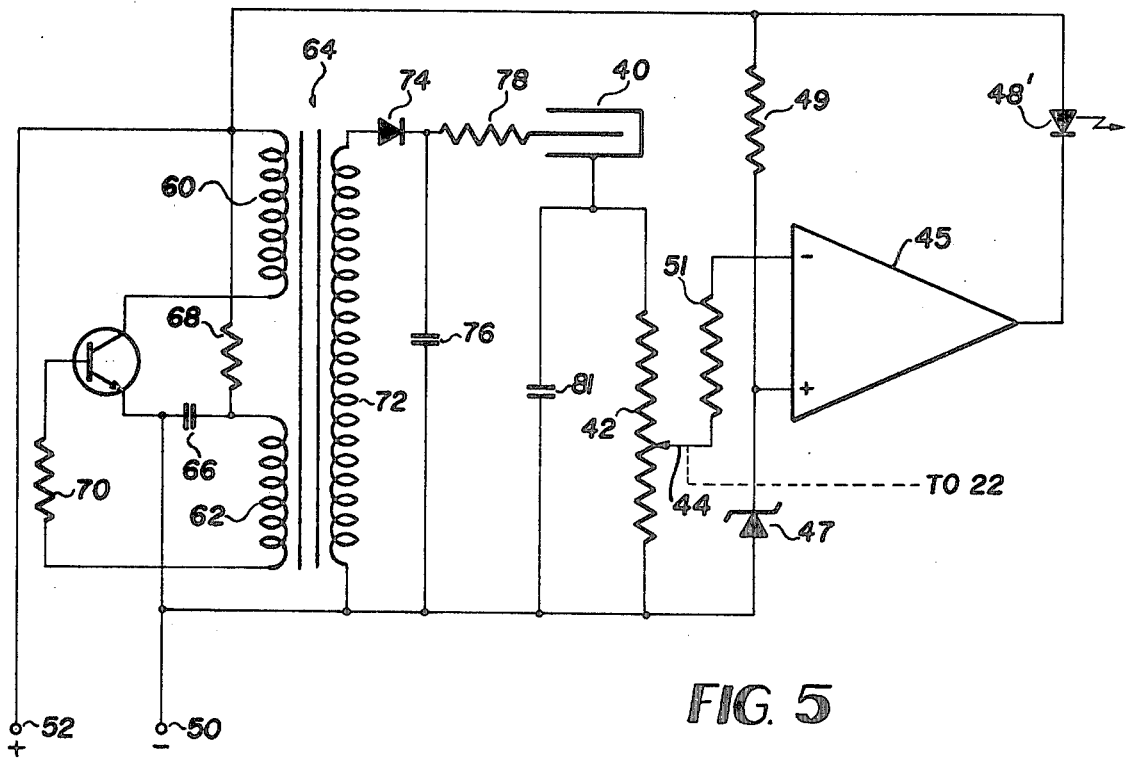
FIG. 5 is a schematic diagram illustrative of yet another modification of the circuit shown in FIG. 3.
Figure 6:
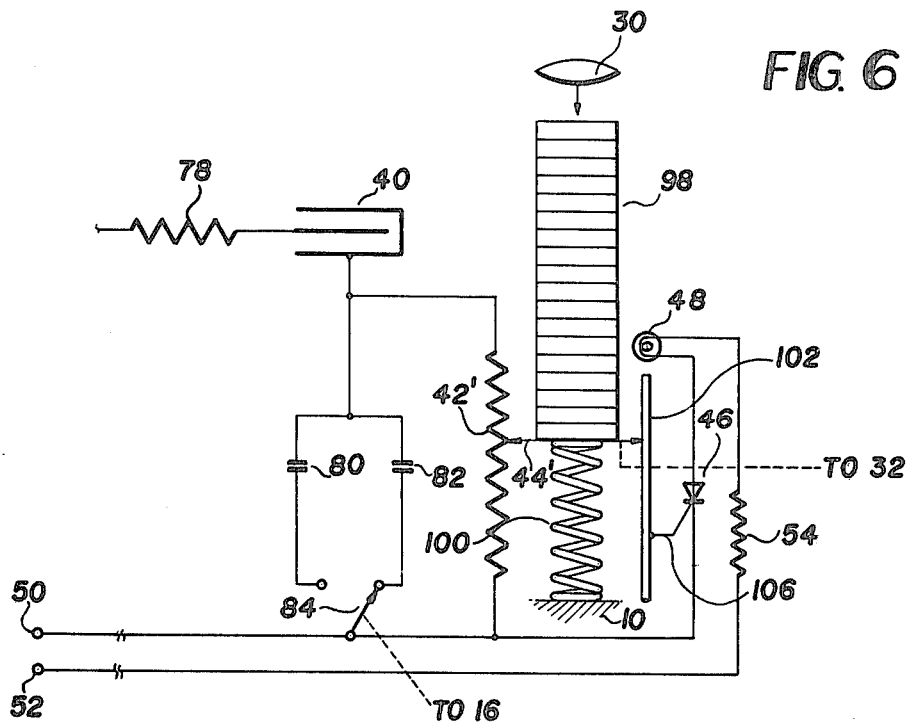
FIG. 6 is a partial electrical diagram of the electrical circuit used in connection with the embodiment shown in FIG. 2.

Prior to discussing this circuitry, however, reference will first be made to FIG. 2 which discloses another embodiment of the structural features of the instrument casing. In FIG. 2, there is also shown a tubular casing 10' having substantially the same dimensions as the casing 10 shown in FIG. 1 with the exception that the dial assembly 24 and the user knob 22 are deleted in favor of a transparent window 30 for looking inside the casing 10' to observe an illuminated indicator arrangement such as shown in FIGS. 5 and 6. In addition to the switch actuator 16, the barrel of the casing 10' includes a second actuator element 32 which is adapted to be moved by the user back and forth along the slot 34. The actuator 32 moreover is adapted to include a pointer element 36 which is adapted to be used with a graduated scale 38. Both the graduated dial 26 shown in FIG. 1 and the scale 38 shown in FIG. 2 are calibrated in terms of radiation dose rate.

Figure 3:
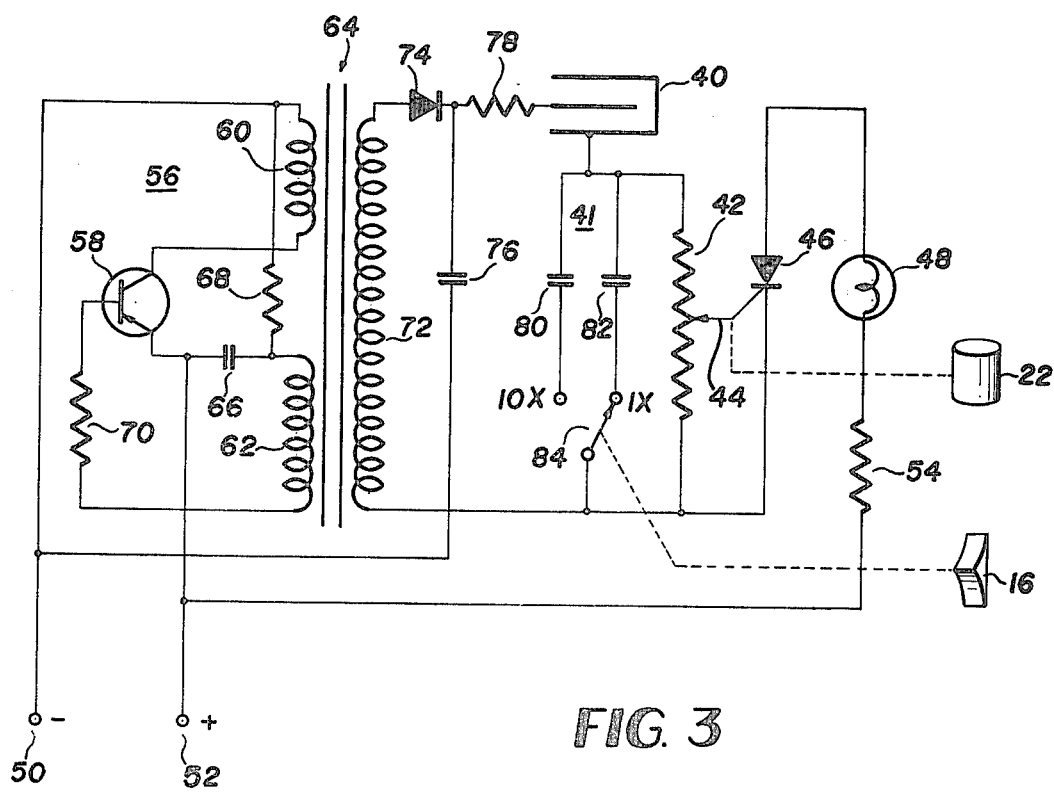
FIG. 3 is an electrical schematic diagram illustrative of the basic electrical circuit of the subject invention.
Figure 4:
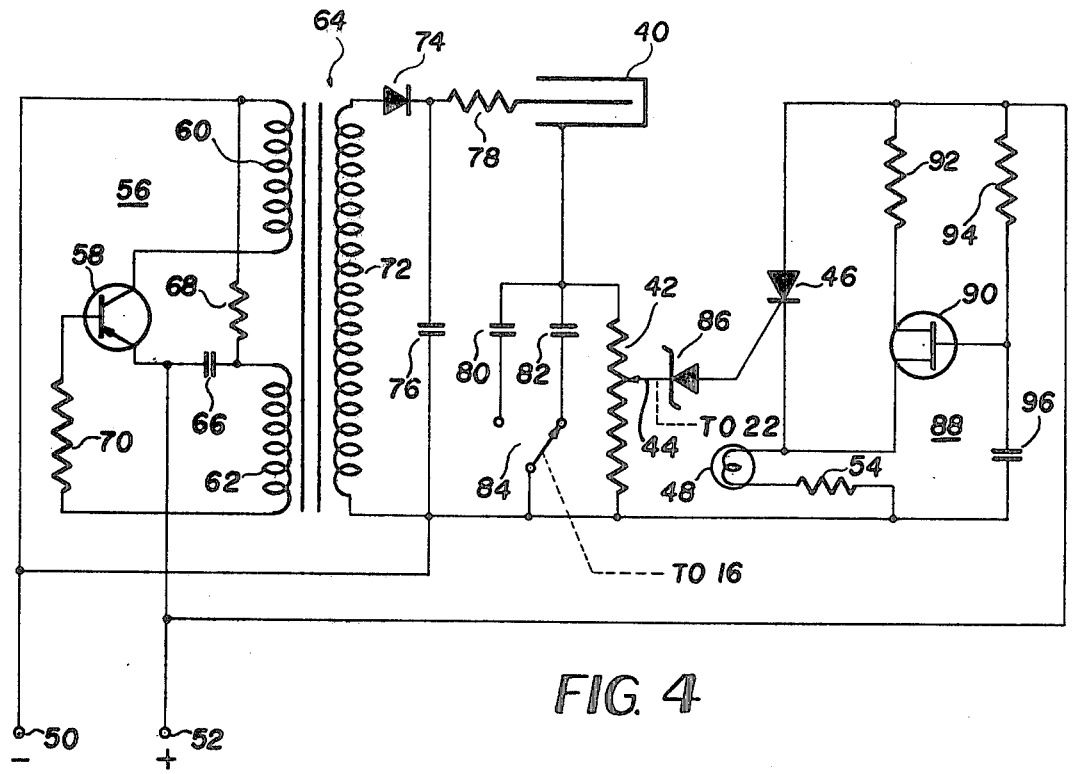
FIG. 4 is an electrical schematic diagram illustrative of a modification of the circuit shown in FIG. 3.

Referring now to the electrical circuitry of the subject invention, reference is first made to FIG. 3. The key elements in this circuit consist of a combination of a miniature Geiger-Mueller (GM) tube 40 series connected to a resistance type potentiometer 42 whose movable slider contact 44 is electrically connected to the gate electrode of a silicon controlled rectifier (SCR) 46 and mechanically coupled to the knob 22 on the casing 10 shown in FIG. 1. A relatively small electric lamp 48 which may be, for example, a well known pin light placed adjacent to or in the aperture 14 is coupled in series with the SCR 46 across a DC source potential which, for example, comprises the aforementioned DC battery which is connectable to terminals 50 and 52. This series circuit is operable such that when the SCR 46 becomes conductive, the lamp 48 will become energized by the DC supply potential coupled to terminals 50 and 52. Additionally, the current limiting resistor 54 is placed in series with the lamp 48 and the SCR 46.

The power supply circuit for the GM tube 40 is implemented by means of a simple transistor blocking oscillator circuit 56 including transistor 58 coupled to the primary windings 60 and 62 of a step-up transformer 64 which provides the required load and feedback. One end of the primary winding 60 is coupled to the collector of transistor 58 while its opposite end is returned to the negative supply terminal 50. The positive supply terminal 52 is directly connected to the emitter of transistor 58 which also is coupled to secondary winding 62 through the capacitor 66 and the winding 60 by means of the resistor 68. Feedback to the base of transistor 58 is provided by the resistor 70 connected to the lower end of primary winding 62.

The operation of this type of circuit is well known and effectively provides a relatively high voltage square wave across the secondary winding 72 which is rectified by means of the diode 74 and filtered by means of the capacitor 76. A DC voltage in the order of 100 volts is thus applied to the inner electrode of the ionization chamber through a current limiting resistor 78. The outer electrode of the GM tube 40 in addition to being connected in series to the potentiometer 42 is selectively coupled to either smoothing capacitor 80 or 82 by means of a single pole double throw switch 84 coupled to the actuator 16 located on the barrel of the casing 10.

The selected capacitor 80 or 82 is adapted to be charged through the operation of the GM tube 40 whose current increases in accordance with an increase in dose rate of the radiation sensed. Accordingly, the voltage across the potentiometer 42 changes in proportion to the dose rate sensed and for a particular dose rate desired to be monitored or measured, a selected setting of the potentiometer contact 44 by means of the knob 22 will cause the SCR 46 to become conductive and energize the lamp 48. It is easily seen then that the dial assembly 24 provides a reading of the position of the contact 44 and is adapted to provide a direct reading of the desired dosage or dose rate sensed. The user is thus able to preset a dose rate level at which the lamp 48 is activated by making a selected dial setting or alternatively measure an unknown radiation field on demand by simply rotating the knob 22 until the lamp 48 is energized and then reading the dose rate from the calibrated scale 26.

Referring now to FIG. 4, there is shown a modification of the circuit shown in FIG. 3 which operates in the same manner except for the following considerations. Circuit elements common to both are designated by like numerals. Only the additional details will be considered however. In FIG. 4 there is the inclusion of a Zener diode 86 coupled from the slider contact 44 to the gate of the SCR 46. The Zener diode has a constant specific threshold voltage which acts as a bias device for the switch device, i.e. the semiconductor voltage controlled switch illustrated as an SCR. Additionally, a unijunction relaxation oscillator circuit 88 is coupled to the series combination of SCR 46 and lamp 48 to act as a commutator for the holding current of the SCR 46, thus allowing the lamp to be turned off when the slider contact 44 detects a voltage level below the threshold voltage of the Zener diode 86. The oscillator 88 operates in the free running mode and includes unijunction transistor 90, having one of its bases connected to the positive DC supply potential terminal 52 by means of the resistor 92 while its other base is connected to the lamp 48. The emitter of the unijunction transistor 90 is coupled to the common connection between the series connection of resistor 94 and capacitor 96 which is coupled across the supply terminals 50 and 52. The R-C time constant of resistor 94 and capacitor 96 determines the frequency of the oscillator in a well known manner. The component values are selected to make the frequency high enough to allow the indicator lamp 48 to be turned off as soon as the user moves the slider contact 44 via the element 22 below the switch on threshold voltage of Zener diode 86.

Referring now to FIG. 5, the means to energize the light source 48' now illustrated as a light emitting diode includes a comparator type operational amplifier 45 having one of its inputs coupled to a reference potential provided by the Zener diode 47 and resistor 49 coupled in series across the DC supply terminals 50 and 52. The other input of operational amplifier 45 is coupled to the slider contact 44 of the potentiometer 42 by means of the coupling resistor 51. In operation, when the contact 44 is moved by the user to a point where the voltage on contact 44 is equal to the reference established by Zener diode 47, the light emitting diode 48' will turn on at which time the operator can when desirable read a calibrated scale.

Figure 7:
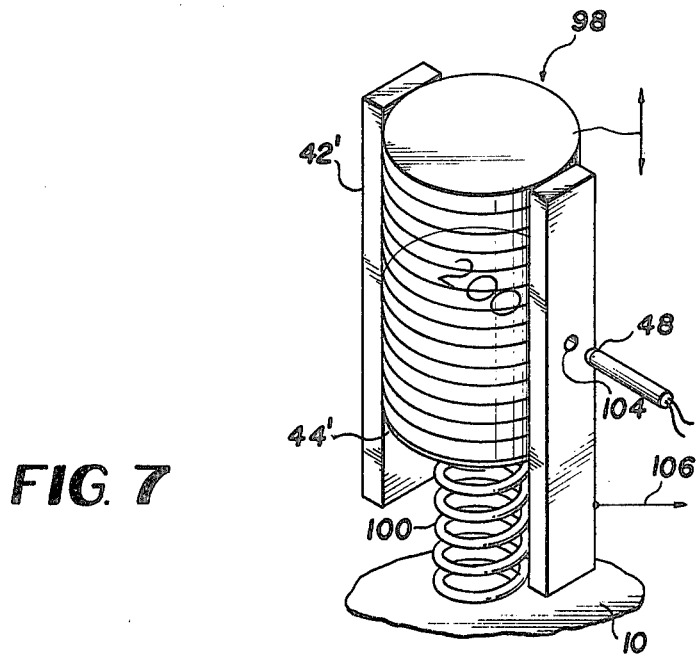
FIG. 7 is a diagram helpful in understanding the operation of the embodiment shown in FIG. 2.

A different type of visual indication is provided in the embodiment of the subject invention shown in FIG. 2 and incorporates the elements shown in FIGS. 6 and 7. Electrically the circuit is substantially as described with respect to FIGS. 3-5. What is different about this embodiment is the use to which the light source is put. Whereas previously energization of the lamp 48 for example was directly visible through the aperture 14, in the present embodiment, it is used to illuminate the edge of one of a plurality of stacked transparent plastic discs 98 having varying numerical indicia thereon so that the particular disc illuminated displays a predetermined reading such as a numerical value of the dose rate sensed by the instrument. The stack of transparent plastic discs 98 are located within the casing 10' being axially aligned so that the particular edge illuminated disc can be seen through the window 30 (FIG. 2). Illustratively, the stack of transparent discs 98 are movably supported within the casing 10' and being spring biased upwardly by means of a spring element 100; however, the stack 98 is mechanically coupled to and movable with the setting of the slider contact 44 of the potentiometer 42 in accordance with movement of the actuator 32 on the outside of the barrel of the casing 10'.

As an illustrative example of a support for the column or stack of transparent discs within the casing 10', one axial support member when desirable may consist of a precision wire resistor 42' having a slidable contact element 44' in which contacts an axial conductive member 102 having an aperture 104 for mounting the pin light lamp light 48 therein or at least being able to direct the light therefrom to the edge of the respective adjacent disc. The conductive element 102 accordingly would have an electric lead 105 connectable to the gate of the silicon controlled rectifier 46. Thus the user moves the column of discs 98 by means of his finger being applied to the actuator 32. This movement changes the voltage applied to the SCR 46 which when the proper voltage is reached for the desired environmental dose rate sought to be monitored or measured, the lamp 48 is turned on and illuminates the proper disc having the numerical value of the dose rate thereon. Alternatively, a similar arrangement can be provided, when desirable, by making the discs 98 stationary and moving the lamp 48.

Thus what has been shown and described is a small meterless dose rate indicator which provides a quantative indication of the radiation sensed by means of an energized miniature light source. Also, when desirable, the light source may be made to blink when activated. Additionally, an audio oscillator and output jack can be included to provide an audio signal when a predetermined dose rate is sensed.

While there has been shown and described what is at present considered to be the preferred embodiments of the invention, further modifications thereto will readily occur to those skilled in the art. It is not desired, therefore, that the invention be limited to the specific arrangements shown and described, but it is to be understood that all equivalents, alterations and modifications coming within the spirit and scope of the invention as defined by the following claims are herein meant to be included.

Accordingly, we claim as our invention:

1. In a pocket size radiation monitor for personal use having an internal power supply for powering a Geiger-Mueller radiation sensing device located within a casing, the improvement comprising:

a user adjustable potentiometer operably coupled to said Geiger-Mueller device so as to have a voltage thereacross proportional to dose rate, said potentiometer having a slider contact which provides a selectively variable output voltage corresponding to a desired radiation dose rate to be monitored or measured;

circuit means coupled to said slider contact and being responsive to said output voltage to become operable at a selected output voltage to effect energization of a light source; and an electrically energized light source coupled to said circuit means and being energized by said power supply when said circuit means becomes operable to indicate the sensing of a predetermined dose rate.

2. The radiation monitor as defined by claim 1 wherein said circuit means comprises voltage controlled switch circuit means.

3. The radiation monitor as defined by claim 2 wherein said switch circuit means comprises a controlled rectifier including a control electrode and first and second power transfer electrodes, said control electrode being coupled to said slider contact and said power transfer electrodes coupling said light source to said internal power supply.

4. The radiation monitor as defined by claim 3 wherein said controlled rectifier comprises a semiconductor controlled rectifier having gate, anode and cathode electrodes and wherein said control electrode comprises the gate electrode, and said first and second power transfer electrodes comprise the anode and cathode electrodes.

5. The radiation monitor as defined by claim 4 and additionally including a Zener diode having a predetermined threshold voltage coupled between said slider contact and said gate electrode.

6. The radiation monitor as defined by claim 5 and additionally including a free running oscillator coupled to said semiconductor controlled rectifier for commutating the holding current of the rectifier to allow said light source to be deenergized when the voltage on said slider contact falls below the threshold voltage of said Zener diode.

7. The radiation monitor as defined by claim 2 wherein said switch circuit means comprises an operational amplifier circuit powered by said internal power supply and having at least one input and output terminal, and wherein said input terminal is coupled to said slider contact and said output terminal is coupled to said light source.

8. The radiation monitor as defined by claim 7 wherein said operational amplifier circuit has another input terminal and including means applying a reference potential to said another input terminal, said amplifier circuit becoming operable to energize said light source when the voltage at said slider contact substantially equals said reference potential.

9. The radiation monitor as defined by claim 8 wherein said means applying a reference potential comprises a Zener diode circuit.

10. The radiation monitor as defined by claim 1 wherein said internal power supply comprises a DC source and an oscillator type power converter circuit coupled to said DC source, said power converter providing a relatively higher DC supply potential which is coupled to said Geiger-Mueller device and wherein said DC source is coupled to said light source under the control of said circuit means.

11. The radiation monitor as defined by claim 1 and additionally including means on said casing coupled to said slider contact of said potentiometer providing user adjustment of said potentiometer.

12. The radiation monitor as defined by claim 11 wherein said last recited means additionally includes indicia for providing an indication to the user of the slider contact setting of said potentiometer.

13. The radiation monitor as defined by claim 12 wherein said indicia comprises part of a dial assembly in said casing.

14. The radiation monitor as defined by claim 12 wherein said indicia comprises a graduated scale on the outside of said casing.

15. The radiation monitor as defined by claim 11 wherein said casing includes an aperture for coupling light from said light source to the exterior of said casing.

16. The radiation monitor as defined by claim 15 wherein said aperture comprises a viewing window at one end of said casing and additionally including a plurality of transparent disc elements positioned in said housing, said light source being positioned adjacent said plurality of disc elements to illuminate the edge of one of said discs when energized to provide an indication of dose rate sensed, and means providing relative movement between said disc elements and said light source in accordance with the slider contact setting of said potentiometer.

17. The radiation monitor as defined by claim 16 wherein each of said plurality of transparent discs has the respective different numerical indication which is observable through said viewing window when edge illuminated by said light source.

18. The radiation monitor as defined by claim 16 wherein said plurality of transparent discs are arranged in a stack and moved axially within said casing while said light source is maintained stationary.

* * * * *